US009139891B2

(12) United States Patent
Sharpe, Jr. et al.

(10) Patent No.: US 9,139,891 B2
(45) Date of Patent: Sep. 22, 2015

(54) SEPARATION METHOD FOR POTASSIUM FROM AQUEOUS KOH SOLUTIONS

(71) Applicant: TENNESSEE BOARD OF REGENTS, Nashville, TN (US)

(72) Inventors: Lonnie Sharpe, Jr., Nashville, TN (US); Taylor Anthony Cappadona, Nashville, TN (US); Roger Dale Painter, Nashville, TN (US); Thomas Duane Byl, Nasville, TN (US); Tasneem Ahmed Siddiquee, Nashville, TN (US); Koen Peter Vercruysse, Nashville, TN (US)

(73) Assignee: TENNESSEE BOARD OF REGENTS, Nashville, TN (US)

( * ) Notice: Subject to any disclaimer, the term of this patent is extended or adjusted under 35 U.S.C. 154(b) by 0 days.

(21) Appl. No.: 14/246,916

(22) Filed: Apr. 7, 2014

(65) Prior Publication Data
US 2014/0219892 A1 Aug. 7, 2014

Related U.S. Application Data

(63) Continuation of application No. 13/966,489, filed on Aug. 14, 2013, now abandoned.

(60) Provisional application No. 61/742,572, filed on Aug. 14, 2012.

(51) Int. Cl.
C22B 26/10 (2006.01)
C01D 7/07 (2006.01)
C02F 1/66 (2006.01)
C02F 1/52 (2006.01)
C02F 101/10 (2006.01)

(52) U.S. Cl.
CPC . *C22B 26/10* (2013.01); *C01D 7/07* (2013.01); *C02F 1/66* (2013.01); *C02F 2001/5218* (2013.01); *C02F 2101/10* (2013.01)

(58) Field of Classification Search
None
See application file for complete search history.

(56) References Cited

U.S. PATENT DOCUMENTS

| 3,202,477 | A | * | 8/1965 | Loeffler, Jr. et al. | 423/421 |
| 3,254,946 | A | * | 6/1966 | Hass et al. | 423/421 |
| 3,773,902 | A | | 11/1973 | Muemann | |
| 3,975,503 | A | * | 8/1976 | Hauschild et al. | 423/421 |
| 7,655,053 | B1 | * | 2/2010 | Bowman | 23/302 T |

* cited by examiner

Primary Examiner — Steven Bos
(74) Attorney, Agent, or Firm — Miles & Stockbridge PC

(57) ABSTRACT

The process described herein demonstrates a more efficient and effective way to remove certain chemicals from industrial waste water. Specifically, the invention set forth demonstrates a method comprised of at least two steps in which up to 96% of potassium can be removed from an aqueous solution comprising potassium hydroxide.

20 Claims, 2 Drawing Sheets

SEPARATION METHOD FOR POTASSIUM FROM AQUEOUS KOH SOLUTIONS

CROSS-REFERENCE TO RELATED APPLICATIONS

This Application is a continuation of non-provisional U.S. Non-Provisional application Ser. No. 13/966,489, filed 14 Aug. 2013, which claimed the benefit of U.S. Provisional Application No. 61/742,572, filed 14 Aug. 2012, the contents of which are hereby incorporated by reference in their entirety.

STATEMENT REGARDING FEDERALLY SPONSORED RESEARCH OR DEVELOPMENT

The invention was made by an agency of the United States Government or under a contract with an agency of the United States Government. The name of the U.S. Government agency and the Government contract number are: B&W Technical Services Y-12, contract 4300074126.

BACKGROUND

1. Field

The invention disclosed herein the method for separating potassium from aqueous potassium hydroxide solution.

2. Description of Related Art

In an increasingly environmental conscious world, one problem that has continued to plague industry and government is how to remove certain harmful chemicals from industrial waste water. One of those noxious chemicals is potassium. There have been attempts to develop a process that is effective. Neumann in U.S. Pat. No. 3,773,902 (1973) for example set forth a method to remove potassium but reported that up to 66% of the potassium would remain in the solution after treatment and that the process was continuous in nature.

BRIEF SUMMARY OF THE INVENTION

The instant invention is a dramatic improvement of the previously known art. This process as a whole separates between about 50 to about 96% of potassium from an aqueous potassium hydroxide (KOH) solution (i.e., KOH dissolved in water). The process is a two-step process. The first step of the process (step 1) is similar, though not identical, to that which was previously reported by Neumann. However, the first step of the current process has been improved to yield greater separation compared to the prior process. The second step (step 2), coupled to the first step, results in a very efficient precipitation of potassium. This process (steps 1 & 2) is useful for any industry that generates concentrated potassium hydroxide solutions as waste. In addition, the end product of the process, potassium carbonate sesquihydrate, is useful for any industry that uses potassium carbonate.

The second step in the process itself is unique. The uniqueness of this process lies in the utilization of nucleation facility for the crystallized solid byproduct. The precipitation of potassium from the waste stream in the form of solid byproduct can only be practically applied as described in this narrative. Previously reported process was a continuous process as opposed to the current process, a batch process, which is better-suited for slow accumulation and treatment after increasing time intervals.

In one embodiment, a method of removing potassium from an aqueous solution comprising potassium hydroxide is provided, the method comprising: 1) placing a volume of said aqueous solution comprising potassium hydroxide into a container, said container comprising a —Si—O—Si— network, and then bubbling carbon dioxide gas though said volume of aqueous solution comprising potassium hydroxide; 2) adding to said volume of aqueous solution comprising potassium hydroxide from step 1), and relative to said volume of aqueous solution comprising potassium hydroxide, about one-half to about one volume of ($C_1$-$C_5$)—OH alcohol; and 3) separating precipitate from the solution of step 2).

In one embodiment, the container is a glass container or a quartz container.

In one embodiment, the bubbling is performed for between about 1 and about 24 hours.

In one embodiment, the bubbling is performed for about 3 hours.

In one embodiment, about one-half volume of ($C_1$-$C_5$)—OH alcohol is added in step 2).

In one embodiment, about one volume of ($C_1$-$C_5$)—OH alcohol is added in step 2).

In one embodiment, the ($C_1$-$C_5$)—OH alcohol is selected from the group consisting of methanol, ethanol, and isopropanol.

In one embodiment, the ($C_1$-$C_5$)—OH alcohol is ethanol.

In one embodiment, the bubbling is performed at a pressure between about 1 and about 5 atmospheres.

In one embodiment, the bubbling is performed at a pressure greater than atmospheric pressure.

In one embodiment, the pH of the volume of said aqueous solution comprising potassium hydroxide, before bubbling said carbon dioxide gas though said volume, is between about 12.5 and 13.5, and after bubbling said carbon dioxide gas though said volume is between about 6 and about 8.

In one embodiment, the pH of the volume of said aqueous solution comprising potassium hydroxide, before bubbling said carbon dioxide gas though said volume, is about 13, and after bubbling said carbon dioxide gas though said volume is between about 7 and about 8.

BRIEF DESCRIPTION OF THE DRAWINGS

For a further understanding of the nature, objects, and advantages of the present disclosure, reference should be had to the following detailed description, read in conjunction with the following drawings, wherein like reference numerals denote like elements.

DETAILED DESCRIPTION

Before the subject disclosure is further described, it is to be understood that the disclosure is not limited to the particular embodiments of the disclosure described below, as variations of the particular embodiments may be made and still fall within the scope of the appended claims. It is also to be understood that the terminology employed is for the purpose of describing particular embodiments, and is not intended to be limiting. Instead, the scope of the present disclosure will be established by the appended claims.

In this specification and the appended claims, the singular forms "a," "an," and "the" include plural reference unless the context clearly dictates otherwise. Unless defined otherwise, all technical and scientific terms used herein have the same meaning as commonly understood to one of ordinary skill in the art to which this invention belongs.

Applicant determined experimentally that the material of the reaction vessel plays a role in the efficiency and separation of the solid product. A glass container, for example, contributes to improved potassium-containing crystal formation and more efficient separation of the potassium-carbonate solids. Glass, among other substances, comprises a —Si—O—Si— network due to the presence of silicon dioxide ($SiO_2$), also called silica. Without wishing to be bound by theory, Applicant hypothesizes that the dangling —OH and Si=O functional groups on the surface of substances comprising a —Si—O—Si— network induce improved nucleation of the potassium-carbonate crystals, thereby improving the efficacy of the crystal-forming reaction. Thus, containers made of, containing, or comprising substances including, but not limited to the following could be used in the instant methods: fused silica glass, soda lime glass, sodium borosilicate glass, lead-oxide glass, aluminosilicate glass, recycled glass, quartz, and combinations thereof.

Figure 1:
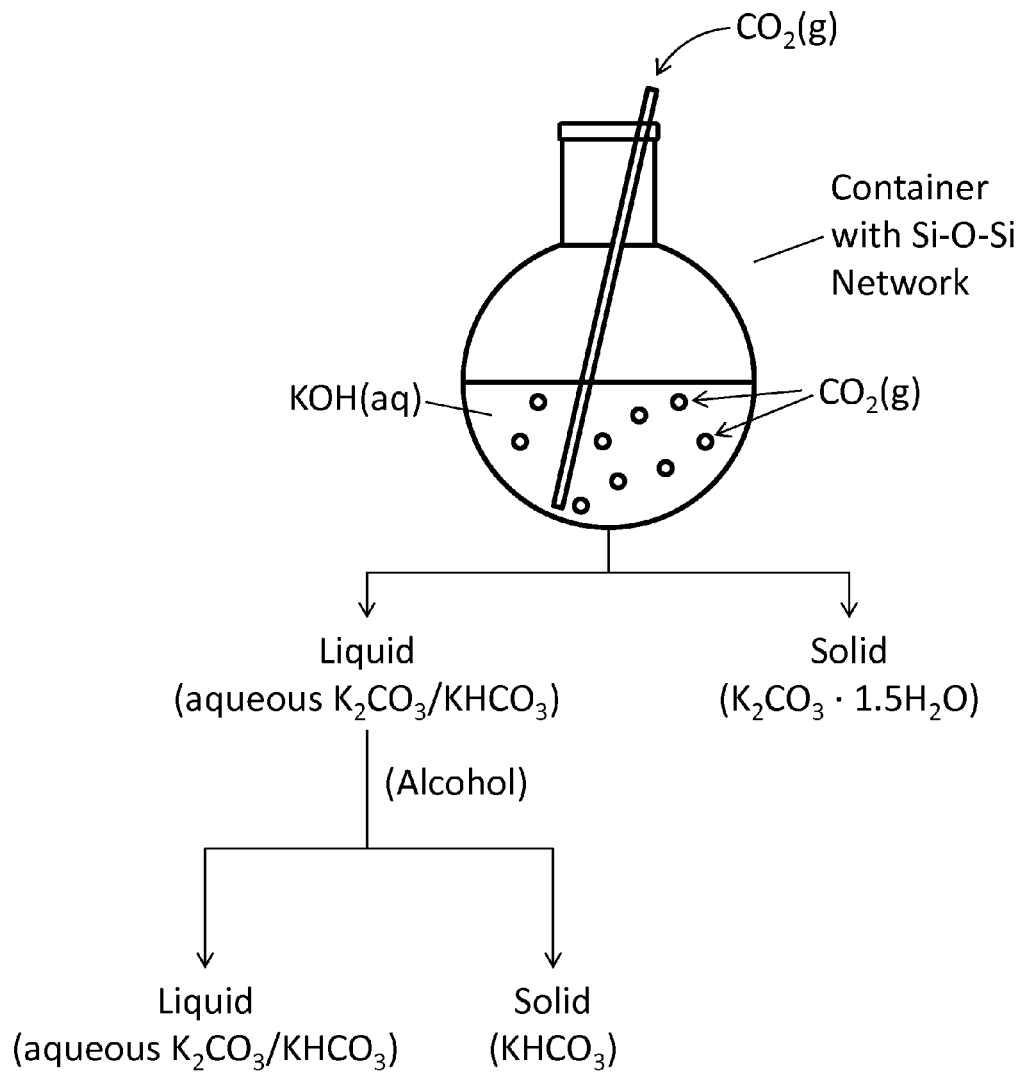
FIG. 1 is a schematic drawing of the separation process.
Figure 2:
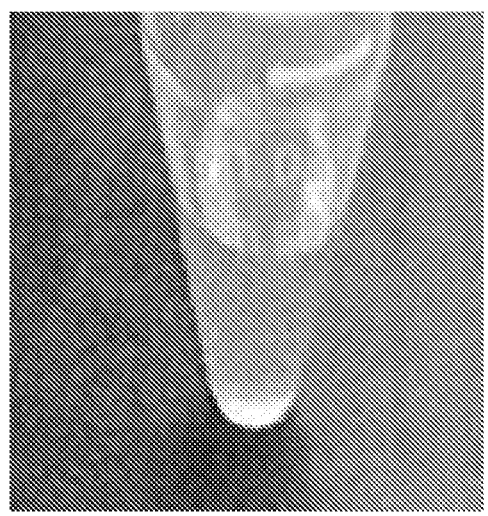
FIG. 2 shows the mother liquor after the first step of bubbling with $CO_2$ gas in a glass container.
Figure 3:
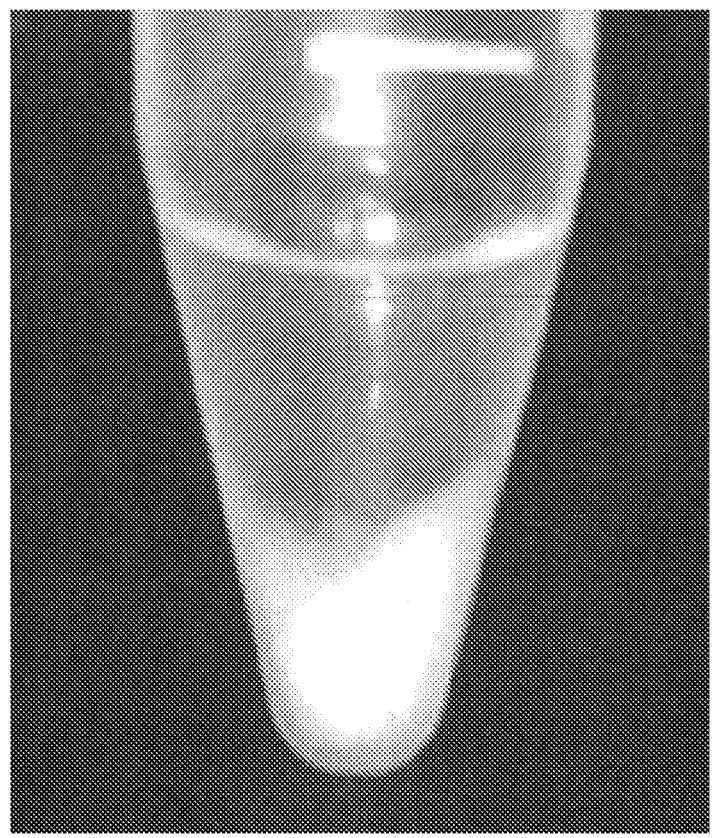
FIG. 3 shows the formation of potassium carbonate solid (white precipitate) after alcohol treatment in step 2.

In one embodiment of the instant method, step 1 is the bubbling of a 50% aqueous KOH solution (50% w/v KOH, in water) contained in a glass vessel with a stream of carbon dioxide ($CO_2$) gas from a pressurized cylinder. The bubbling is done at atmospheric pressure. A three hour bubbling treatment of carbon dioxide yields a crystalline solid (potassium carbonate sesquihydrate, $K_2CO_3.1.5\ H_2O$) and some remaining potassium carbonate ($K_2CO_3$) dissolved in the initial liquor solution (see FIG. 1). The potassium carbonate sesquihydrate solid can be separated by, for example, filtration, settling, or centrifugation. At the end of step 1, about 63% of the initial potassium is removed from the 50% aqueous KOH solution.

Step 2 of the instant method comprises treatment of the solution from step 1 with about one-half volume to about an equal volume of ethanol or other suitable ($C_1$-$C_5$)—OH solvent. The addition of ethanol, for example, to the remaining mixture lowers the solubility of the remaining potassium carbonate, causing additional potassium carbonate crystals to form and precipitate out of solution. This method is unique and unexpected because alcohol is practically immiscible with an aqueous potassium carbonate solution (i.e., a solution prepared from water and potassium carbonate). In this case, however, they mix because the mother liquor from step 1 comprises not only potassium carbonate but also bicarbonate ions (e.g., $KHCO_3$).

At the end of step 2, about 77% of the remaining dissolved potassium is transformed into precipitate and can be removed from the initial solution by filtration, settling, centrifugation, or any other technique commonly known to those of ordinary skill in the art. The overall separation efficiency of the two step method is such that about 91% of the potassium is removed from an initial solution of 50% aqueous potassium hydroxide.

EXAMPLE 1

KOH Waste Stream Treatment

From a pressurized $CO_2$ cylinder, via a manifold, three batches (200 mL, 1 L, and 3 L) of a waste KOH sample were bubbled for three hours. This step of the treatment process was exothermic. From room temperature, the temperatures of the batches rose to 41°, 39° and 31° C. for the 200 mL, 1 L and 3 L volumes, respectively. The pH of the original waste stream was about 13, and after bubbling with $CO_2$ the final pH of the treated batches was between about 7 and about 8. In the original method, which was developed with an aqueous potassium hydroxide solution of 50% concentration, a majority of the potassium would separate as a crystalline solid material (potassium carbonate sesquihydrate) at this step. Here, using an actual waste sample, no crystalline materials were separated at this point. This is reasonable and expected because the original method was developed using an aqueous potassium hydroxide solution of 50% concentration. By contrast, the actual waste sample had a potassium concentration of 10.6% (as determined by laboratory analysis). After completion of the first step, a one-half volume of ethanol was added to each of the samples, as described above, and the precipitate allowed to form. The second step of the process removed about 50 to about 60% of potassium from the samples (as compared to the starting potassium concentration). The solid samples were analyzed by X-ray powder diffraction (XRD) method, and were identified as potassium bicarbonate ($KHCO_3$) instead of potassium carbonate sesquihydrate ($K_2CO_3.1.5\ H_2O$). Although different forms of the compound with preferred orientation were detected, no other minor or intermediate constituents were detected.

The effectiveness of the second step was unexpected because when a pure water/potassium carbonate solution is treated with ethanol, the solution remains unchanged and immiscible. Here however, treating the $CO_2$-treated potassium sample (step 1) with a one-half volume of ethanol (step 2) allowed separation of about 50 to about 60% of the potassium from waste samples containing 10.6% potassium.

All references cited in this specification are herein incorporated by reference as though each reference was specifically and individually indicated to be incorporated by reference. The citation of any reference is for its disclosure prior to the filing date and should not be construed as an admission that the present disclosure is not entitled to antedate such reference by virtue of prior invention.

It will be understood that each of the elements described above, or two or more together may also find a useful application in other types of methods differing from the type described above. Without further analysis, the foregoing will so fully reveal the gist of the present disclosure that others can, by applying current knowledge, readily adapt it for various applications without omitting features that, from the standpoint of prior art, fairly constitute essential characteristics of the generic or specific aspects of this disclosure set forth in the appended claims. The foregoing embodiments are presented by way of example only; the scope of the present disclosure is to be limited only by the following claims.

What is claimed is:

1. A method of separating potassium from an aqueous solution comprising potassium hydroxide, the method comprising:
   1) placing a volume of said aqueous solution comprising potassium hydroxide into a container, said container comprising a —Si—O—Si— network, and then bubbling carbon dioxide gas though said volume of aqueous solution comprising potassium hydroxide;
   2) adding to said volume of aqueous solution comprising potassium hydroxide from step 1), and relative to said volume of aqueous solution comprising potassium hydroxide, about one-half to about one volume of ($C_1$-$C_5$)—OH alcohol; and
   3) separating precipitate from the solution of step 2).

2. The method of claim 1, wherein the container is a glass container or a quartz container.

3. The method of claim 1, wherein the bubbling is performed for between about 1 and about 24 hours.

4. The method of claim 1, wherein the bubbling is performed for about 3 hours.

5. The method of claim 1, wherein about one-half volume of ($C_1$-$C_5$)—OH alcohol is added in step 2).

6. The method of claim 1, wherein about one volume of ($C_1$-$C_5$)—OH alcohol is added in step 2).

7. The method of claim 1, wherein the ($C_1$-$C_5$)—OH alcohol is selected from the group consisting of methanol, ethanol, and isopropanol.

8. The method of claim 1, wherein the ($C_1$-$C_5$)—OH alcohol is ethanol.

9. The method of claims 1, wherein the bubbling is performed at a pressure between about 1 and about 5 atmospheres.

10. The method of claim 1, wherein the bubbling is performed at a pressure greater than atmospheric pressure.

11. The method of claim 1, wherein the pH of the volume of said aqueous solution comprising potassium hydroxide, before bubbling said carbon dioxide gas through said volume, is between about 12.5 and 13.5, and after bubbling said carbon dioxide gas through said volume is between about 6 and about 8.

12. The method of claim 1, wherein the pH of the volume of said aqueous solution comprising potassium hydroxide, before bubbling said carbon dioxide gas through said volume, is about 13, and after bubbling said carbon dioxide gas through said volume is between about 7 and about 8.

13. The method of claim 1, wherein the amount of potassium in the precipitate of step 3) is at least about 50% of the amount of potassium in the aqueous solution comprising potassium hydroxide of step 1), before bubbling with carbon dioxide.

14. The method of claim 1, wherein the amount of potassium in the precipitate of step 3) is at least about 60% of the amount of potassium in the aqueous solution comprising potassium hydroxide of step 1), before bubbling with carbon dioxide.

15. The method of claim 1, wherein the amount of potassium in the precipitate of step 3) is at least about 80% of the amount of potassium in the aqueous solution comprising potassium hydroxide of step 1), before bubbling with carbon dioxide.

16. The method of claim 1, wherein the amount of potassium in the precipitate of step 3) is at least about 90% of the amount of potassium in the aqueous solution comprising potassium hydroxide of step 1), before bubbling with carbon dioxide.

17. The method of claim 1, wherein the amount of potassium in the precipitate of step 3) is at least about 96% of the amount of potassium in the aqueous solution comprising potassium hydroxide of step 1), before bubbling with carbon dioxide.

18. A method of separating potassium from an aqueous solution comprising potassium hydroxide, the method comprising:
1) placing a volume of said aqueous solution comprising potassium hydroxide into a container, said container comprising a —Si—O—Si— network, and then bubbling carbon dioxide gas though said volume of aqueous solution comprising potassium hydroxide;
2) adding to said volume of aqueous solution comprising potassium hydroxide from step 1), and relative to said volume of aqueous solution comprising potassium hydroxide, about one-half to about one volume of ($C_1$-$C_5$)—OH alcohol; and
3) separating precipitate from the solution of step 2), wherein:
a) the container is a glass container or a quartz container;
b) the bubbling is performed for between about 1 and about 24 hours;
c) wherein the ($C_1$-$C_5$)—OH alcohol is selected from the group consisting of methanol, ethanol, and isopropanol;
d) wherein the bubbling is performed at a pressure between about 1 and about 5 atmospheres;
e) wherein the pH of the volume of said aqueous solution comprising potassium hydroxide, before bubbling said carbon dioxide gas through said volume, is between about 12.5 and 13.5, and after bubbling said carbon dioxide gas through said volume is between about 6 and about 8; and
wherein the amount of potassium in the precipitate of step 3) is at least about 50% of the amount of potassium in the aqueous solution comprising potassium hydroxide of step 1), before bubbling with carbon dioxide.

19. The method of claim 18, wherein the amount of potassium in the precipitate of step 3) is at least about 96% of the amount of potassium in the aqueous solution comprising potassium hydroxide of step 1), before bubbling with carbon dioxide 20. A method of separating potassium from an aqueous solution comprising potassium hydroxide, the method comprising:
1) placing a volume of said aqueous solution comprising potassium hydroxide into a container, said container comprising a —Si—O—Si— network, and then bubbling carbon dioxide gas though said volume of aqueous solution comprising potassium hydroxide;
2) adding to said volume of aqueous solution comprising potassium hydroxide from step 1), and relative to said volume of aqueous solution comprising potassium hydroxide, about one-half volume of ($C_1$-$C_5$)—OH alcohol; and
3) separating precipitate from the solution of step 2), wherein:
a) the container is a glass container container;
b) the bubbling is performed for about 3 hours;
c) wherein the ($C_1$-$C_5$)—OH alcohol is ethanol;
d) wherein the bubbling is performed at a pressure of about 1 atmosphere;
e) wherein the pH of the volume of said aqueous solution comprising potassium hydroxide, before bubbling said carbon dioxide gas through said volume, is about 13, and after bubbling said carbon dioxide gas through said volume is between about 7 and about 8; and
wherein the amount of potassium in the precipitate of step 3) is at least about 60% of the amount of potassium in the aqueous solution comprising potassium hydroxide of step 1), before bubbling with carbon dioxide.

* * * * *